United States Patent

[11] 3,629,723

[72] Inventor Elias Snitzer
 Wellesley, Mass.
[21] Appl. No. 817,867
[22] Filed Apr. 21, 1969
[45] Patented Dec. 21, 1971
[73] Assignee American Optical Corporation
 Southbridge, Mass.
 Continuation-in-part of application Ser. No.
 375,568, June 16, 1964, now abandoned.
 This application Apr. 21, 1969, Ser. No.
 817,867

[54] ATHERMAL LASER USING A ONE-EIGHTH WAVE FARADAY ROTATOR
 9 Claims, 11 Drawing Figs.

[52] U.S. Cl. ...................................................... 331/94.5
[51] Int. Cl. ...................................................... H01s 3/16
[50] Field of Search ........................................... 331/94.5

[56] References Cited
 UNITED STATES PATENTS
 3,247,467 4/1966 Geusic et al. .................. 331/94.5
 3,281,712 10/1966 Koester ........................ 331/94.5
 3,286,193 11/1966 Koester et al. ................. 331/94.5

OTHER REFERENCES

Snitzer: " Glass Lasers," The Glass Industry, September/October, 1967, pp. 11– 19.

Primary Examiner—Ronald L. Wibert
Assistant Examiner—Edward S. Bauer
Attorneys—William C. Nealon, Noble S. Williams, Robert J. Bird and Bernard L. Sweeney ABSTRACT: A laser device with a laser rod positioned within an optical resonant cavity. The composition of the rod is chosen to have a coefficient of linear expansion $\alpha_L$ and a thermal coefficient of the index of refraction $\alpha_n$ such that the average of the optical path lengths for radial and tangential polarization is equal to the optical path lengths for a ray through the center of the rod. A mode selecting aperture is positioned at an end of the rod along the axis of the cavity for discriminating against all but the $HE_{11}$ mode. A ⅛ wave Faraday rotator is also positioned along the axis of the cavity. The result is a laser device in which the thermal gradient effects are substantially eliminated.

INVENTOR
ELIAS SNITZER
BY
ATTORNEY

NOTES
108 (VARIATION OF WAVE FRONT DUE TO STRESS FOR TANGENTIALLY POLARIZED LIGHT)
120 (VARIATION OF WAVE FRONT DUE TO STRESS FOR AVERAGE OF RADIALLY AND TANGENTIALLY POLARIZED LIGHT)
114 (VARIATION OF WAVE FRONT DUE TO STRESS FOR RADIALLY POLARIZED LIGHT)
116 (VARIATION OF WAVE FRONT DUE TO TEMPERATURE)

INVENTOR.
ELIAS SNITZER
BY
ATTORNEY

INVENTOR.
ELIAS SNITZER
BY Noble S. Williams
ATTORNEY

|  | $\alpha_n$ | $\gamma$ |
|---|---|---|
| CONCENTRIC CYLINDER | $-67 \times 10^{-7}$ | 1.00 |
| LONG ROD (RADIAL POLARIZATION) | $-42 \times 10^{-7}$ | 0.87 |
| LONG ROD (TANGENTIAL POLARIZATION) | $-34 \times 10^{-7}$ | 0.99 |
| LONG ROD (AVERAGE OF RADIAL & TANGENTIAL POLARIZATION) | $-38 \times 10^{-7}$ | 0.93 |
| STACKED DISC (RADIAL POLARIZATION) | $-48 \times 10^{-7}$ | 0.79 |
| STACKED DISC (TANGENTIAL POLARIZATION) | $-42 \times 10^{-7}$ | 0.87 |
| STACKED DISC (AVERAGE OF RADIAL & TANGENTIAL POLARIZATION) | $-45 \times 10^{-7}$ | 0.83 |

*Fig. 8*

ATHERMAL LASER USING A ONE-EIGHTH WAVE FARADAY ROTATOR

CROSS REFERENCES TO RELATED APPLICATIONS

This application is a continuation-in-part of application Ser. No. 375,568 filed June 16, 1964, now abandoned.

This invention relates to laser apparatus and more particularly to the composition of laser devices and apparatus associated therewith to enable the elimination of the effects of the thermal gradients in the resonant cavity.

Lasers, otherwise referred to as optical masers, are light-amplifying or light-producing devices and are specifically adapted to provide an output of high-intensity, coherent, monochromatic light. Such light is produced in a laser (an acronym for *light amplification by stimulated emission of radiation*) by photonic emission from the active atoms of a body or core composed of a so-called laser material. These atoms, which are in a "positive temperature" state absorb a quantum of light from a flash lamp, said light being at a frequency proportional to the difference in energy between two of the energy levels of the atom. The atoms are, therefore, "pumped" or excited to a high energy level and a "negative temperature" state of population inversion, from which they rapidly relax to a more stable intermediate level (still above the original level). The atoms then relax, at a somewhat slower rate, from this intermediate level to the original level with an attendant emission of light. This emission by the spontaneous relaxation to the original level is fluorescence, which stimulates a further relaxation of atoms still at the intermediate level and the desired laser output is obtained. The laser output is coherent since it moves in phase with the stimulating fluorescent light given off from the spontaneous emission, and intensity in a narrow cone is provided by the structure of a laser, which is in the form of a rod, one end of which is totally reflective and the other end of which is slightly transmissive. The only light which is strongly amplified is that which moves in the same direction as the fluorescent light (perpendicular to the ends) and, therefore, the output has almost all of its intensity in a narrow cone.

By way of example, one conventional form of laser structure includes a rod-shaped body composed of a suitable solid laser host material containing a quantity of activator material, said body being surrounded concentrically by a helical gaseous-discharge flash tube adapted to emit a pulse of light specifically including light in the wavelength of an absorption band of the laser material. When the flash tube is actuated, this light pulse enters the laser body, is absorbed by the laser material, and thereby pumps the body with energy of such absorptive wavelength. This pumping excites active atoms in the laser body to shift from an initial low energy level, in a series of interlevel transitions typically involving a first energy-absorptive transition, to a short-lived high energy level and an immediately subsequent spontaneous nonradiative transition (with release of heat energy but presently regarded as nonemissive) from this unstable level to the somewhat more stable upper energy level referred to above (intermediate in energy between the aforementioned initial and unstable levels), and from which light-emissive transition occurs. Thus, the pumping pulse provides the excitation step in laser operation, creating a very large population of atoms at the upper energy level in the laser body. The establishment of this large upper level population is referred to as an inversion of energy states of the body.

For effecting induced light-emissive transition from this level to complete the atomic cycle of laser operation, the laser body of the structure is disposed coaxially within a resonant cavity between opposed reflective cavity ends. Immediately upon the inversion of energy states of the body, individual atoms at the aforementioned upper energy level begin to undergo emissive transition, spontaneously shifting to a lower energy level or terminal level (which may or may not be the initial, lowest energy level, i.e. the ground state, depending on the nature of the laser material used) with concomitant emission of light. Since this upper energy level is relatively stable in a laser material, such spontaneous emission would deplete the enlarged upper level population at a comparatively slow rate. However, a portion of the light emitted by the spontaneously emitting atoms passes through the resonant cavity to the ends thereof and is thence reflected back-and-forth through the cavity between the reflective cavity ends, passing and repassing in multiple bidirectional reflections. This bidirectionally reflected light immediately excites other atoms at the upper energy level to induce them to undergo emissive transition to the terminal level, producing more light, which augments the bidirectionally reflected light in the cavity to induce still further emissive transitions from the upper level population. In such fashion a rising pulse of bidirectionally reflected light quickly develops within the cavity, reaching a quantitatively large value as the induced emissive transition of atoms from the upper level population becomes massive. Light of high intensity is accordingly created in one or a succession of light pulses while the pumping light is present, the action continuing until depletion of this population by such transitions restores the laser body to a normal energy state. To permit emission of such portion of this large bidirectionally reflected light pulse or pulses from the laser cavity, one reflective end of the cavity is made partially transmissive. The fraction of the bidirectionally reflected light escaping therethrough constitutes the laser output pulse.

It has been found that the intensity of the useful portion of the laser output pulse can be enhanced by restricting the bidirectional reflection of light in the laser cavity to light emitted in certain selected modes of propagation. The atoms in a laser body emit light in a plurality of such modes, including the modes for the plane waves propagated parallel to the long axis of the body, hereinafter designated the axial plane wave modes, and modes for waves directed at angles to the axis, hereinafter referred to as off-axis modes. In particular, if the only light allowed to reflect bidirectionally through the cavity were light emitted in the axial plane wave modes, so as to effect stimulation of emission predominately by mode-selected plane wave light energy, a high degree of emissive efficiency would be achieved. The laser output of light in the plane wave front (the useful portion of the output pulse) would be significantly greater than it is when bidirectional reflection of light in off-axis modes is allowed to develop in the cavity; the beam spread angle of the output pulse would be reduced; and as a result the output intensity, or power per unit solid angle delivered by the laser at any given distance (an inverse function of the beam spread angle), would be advantageously increased. Correspondingly, it has been found that in general, to the extent that bidirectional reflection of light emitted in the off-axis modes can be inhibited, the intensity in a single mode of the laser output pulse may be desirably improved.

In one preferred system for effecting such mode-selective laser operation, light emitted from the laser body and reflecting back and forth within the cavity is focused as by a suitable lens through a focal point intermediate the body and one of the reflective cavity ends. A mask defining an aperture is positioned in the cavity so that the aperture coincides with this focal point. The aperture permits light in selected modes to pass through the focal point, while the surrounding mask, occluding a portion of the image formed by the lens at the focal point, dissipates light energy emitted in other modes. Bidirectional reflection of light in the cavity is thereby limited to modes for waves directed through the aperture by the lens; light emitted in other modes cannot pass beyond the focal point to the aforementioned cavity end, and thus cannot reflect bidirectionally between this end and the opposed cavity end, because it is blocked by the mask.

The mask referred to above may be a plane opaque member having a surface of minimal reflectivity by its deflection capability for incident light and it is pierced by a slit, aperture, or other opening of appropriate configuration (ordinarily smaller, at least in minimum dimension, than the image formed at the focal point by the lens with a conventional laser as the source); light not directed through the aperture is deflected by the mask in the region adjacent the aperture.

The flash tube, as it is called, for "pumping" or providing the initial energy inversion is usually in the form of a helix concentrically surrounding and in spatial relationship to the laser core, whose coils are equally spaced along the length of the laser rod to distribute its heat emission evenly along the rod. However, it may be seen that the radial heat distribution is quite uneven, the flash tube causing high temperatures at the periphery of the rod and lower temperatures at the axis. The thermal stress distribution in the rod is therefore similarly uneven, causing a change in index of refraction during "pumping" by the flash tube and a resulting reduction in beam definition, which is intimately related to desired laser output.

Furthermore, stress birefringence is caused throughout the laser rod by uneven temperature, except at its axis, so that light polarized tangentially will encounter a different index of refraction than light polarized radially at all points not on the axis. The total result of the varying indices of refraction is a difference in path length with distance from the axis, and with polarization, and a consequent reduction in beam definition.

At the present time the laser art is proceeding without compensation for these problems. Lens compensation is impractical, since a fixed lens becomes useless in the face of a constantly changing variation in the indices of refraction, and, obviously, a series of insertable lenses are also unsatisfactory.

Accordingly, a primary object of the present invention is to compensate for the effects of thermal gradients produced in a laser rod by the heat from the flash tube.

A more specific object is to control the composition of a laser rod and the path of resonant light therewithin so that it is not affected by the aforementioned thermal gradients and stress birefringence.

A further specific object is to select a mode of propagation whose output is plane polarized and in a wave front of uniform intensity and uniformly perpendicular to the laser axis, this to be accomplished by taking the average of the radial and tangential vectors of that mode.

These and other objects are accomplished in one illustrative embodiment of the invention, which features a pin hole in a deflecting plate and a lens system for selection of the $HE_{11}$ mode of propagation, and a one-eighth wave Faraday rotator for averaging the path length of tangentially and radially polarized light waves.

Other objects, features, embodiments and modifications are contemplated and will be described and apparent from the following more detailed discussion and reference to the accompanying drawing, wherein:

FIG. 1 diagrammatically represents transverse components of the electric vectors for the four lowest order sets of modes in a dielectric waveguide and in a laser structure; FIG. 2 is a plot of radiation patterns or far field distributions of light intensity emitted by a laser operating in each of the modes of FIG. 1;

FIG. 8 shows a table of the values obtained, which are useful in plotting the curve of FIG. 7.

Since the stress components in the radial direction differ from the stress components in the tangential direction, except at the center or axis of the laser rod, a plane wave of arbitrary polarization will necessarily be distorted, when passing through the laser, by stress birefringence produced largely by the flash tube. It will be shown that it is possible to choose the coefficient of linear expansion, $\alpha_L$, and the thermal coefficient of the index of refraction, $\alpha_n$, so that the path length of a ray through the edge of the rod is equal to the path length of a ray through the edge of the rod, with polarization both in the tangential and radial directions. The single mode $HE_{11}$ is excited and a pin hole of preselected diameter is provided in a deflector between two lenses for isolation of that mode. Also, a Faraday rotator is placed at the opposite end of the laser rod from the lens-deflector system, for averaging tangential and radial electric vectors of the $HE_{11}$ mode. A stress analysis for extreme laser rod configurations will then be presented and a plot derived for relating various configurations to the thermal coefficient $\gamma$ (related to $\alpha_L$ and $\alpha_n$), from which plot the composition of the laser material can be specified for the average position of polarization in the radial and tangential directions.

Figure 1:
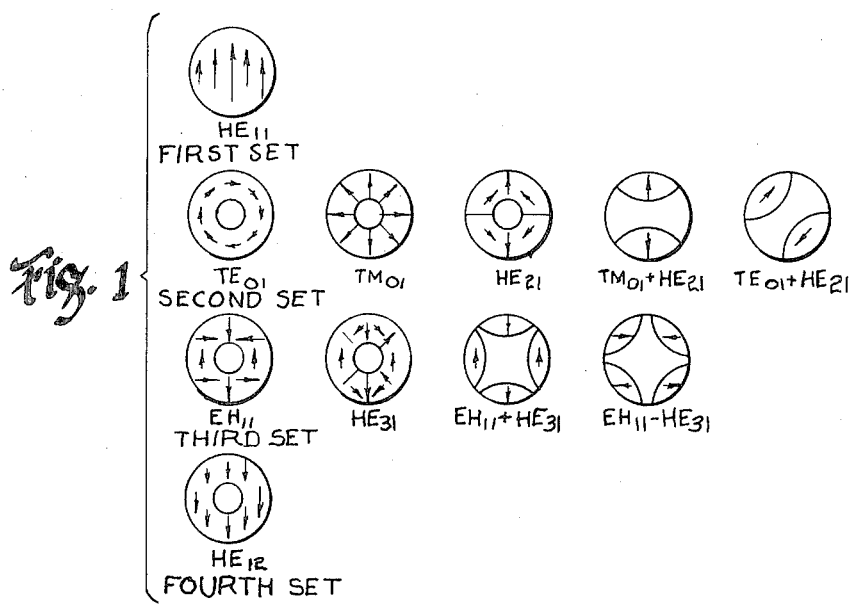

Referring first to FIG. 1, the electric vectors for four sets of modes are shown. The first set includes only the $HE_{11}$ mode; the second set includes $TE_{01}$, $TM_{01}$, 21, $TM_{01} + HE_{21}$, and $TE_{01} + HE_{21}$; the third set includes $EH_{11}$, $HE_{31}$, $EH_{11} + HE_{31}$, and $EH_{11} - HE_{31}$; and the fourth set includes only the $HE_{12}$ mode.

Figure 2:
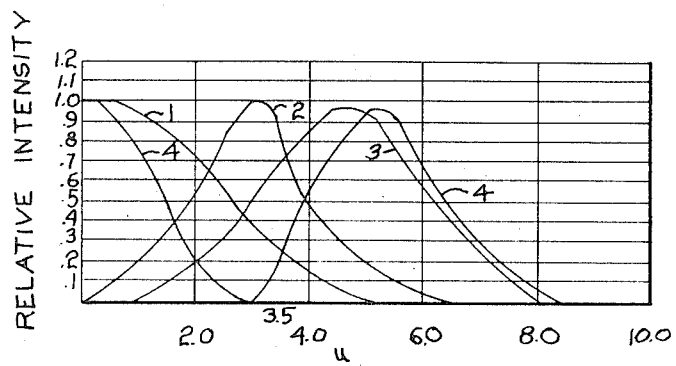

FIG. 2 is a plot of the relative intensity versus $u$ for the four sets of modes shown in FIG. 1. This plot essentially represents a Fourier transformation of the so-called direct image intensity distribution. By choosing the proper $u$, discrimination against certain sets of modes is obtained. For example, if $u$ is chosen to be 3.5, which represents the ratio of the circumference of the laser aperture times the sin $\theta_1$ to the wavelength of a laser ray (the angle $\theta_1$ will be defined subsequently), sets 2, 3 and 4 of the modes shown in FIG. 1 will be substantially eliminated, since a significant portion of their intensity will be cut off.

Figure 3:
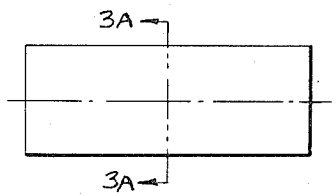
FIG. 3 is a representation of a typical laser rod.

FIG. 3 is a representation of a typical laser rod, that FIGURE being a side view of a substantially cylindrical configuration.

Figure 3A:
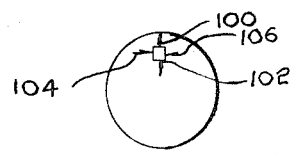
FIG. 3A is a sectional diagrammatic representation of the compression and tension on an isolated portion of a plane of the medium perpendicular to the axis of the laser rod of FIG. 3, through which light is propagating stresses being caused by the variation in temperature within the laser rod.
Figure 4:
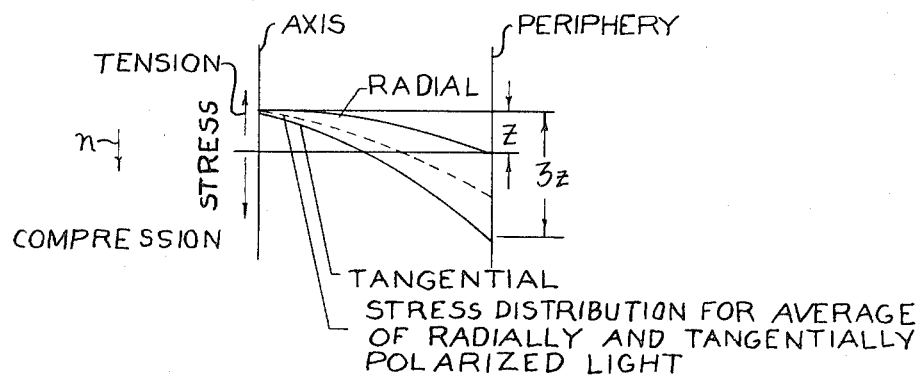
FIG. 4 is a plot of the stress distributions for the tangential and radial directions of polarization.

FIG. 3A is a sectional diagrammatic representation of the compression and tension of an isolated portion of a plane of the medium perpendicular to the axis of the laser rod of FIG. 3, through which the light is propagating with the stresses being caused by the variation in temperature within the laser rod, which are, in turn, caused by the nonuniform distribution of the heat from the flash tube as described in the introduction. The radial stresses 100 and 102 are tension stresses, whether or not the laser rod is analyzed at its center or periphery, as shown by the plot of FIG. 4. For tangential stresses 104 and 106, it may be seen from the plot of FIG. 4 that these stresses are compressive near the periphery of the laser rod and in tension near the axis or center of the rod. Relating the aforementioned stresses to indices of refraction, it is known that a medium under tension has a lesser index of refraction than light being compressed, so that the indices of refraction $n$ will vary approximately according to the plot for stresses shown in FIG. 4.

Figure 5:
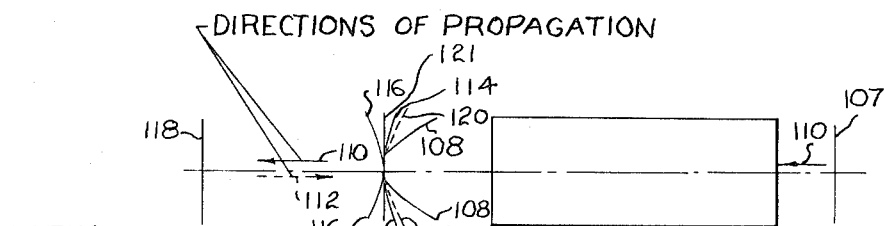
FIG. 5 is a representation of the laser rod of FIG. 3 shown with the equiphase surfaces or wave fronts, depicting also the variation in index of refraction due to temperature, radial stresses, and tangential stresses and the average variation of the index of refraction for tangential and radial stresses attained by the apparatus of the invention.

Referring then to FIG. 5, the approximate variations of the wave fronts (related to the variations of the index of refraction $n$) are shown as light emerges from the end of a laser rod. An entering plane wave 107 and an optically perfect laser rod are assumed, so that with tangentially polarized light, the variation 108 of the wave front due to stresses is shown for the direction of propagation 110, which is depicted as a solid arrow. Since the index of refraction is less and consequently the phase velocity is greater at the axis of the rod than at its periphery, the equiphase surface of wave front 108 will be convex, protruding in the direction of propagation near the axis of the rod. On the other hand, the variation 114 of the wave front due to stress for radially polarized light is less protruded at the center of the rod even though for such polarization the index of refraction is still less at the center than at the periphery of the rod. The difference in convexity between variations 108 and 114 is best illustrated by reference to FIG. 4 where the index of refraction $n$ increases downwardly in that plot and for tangential polarization increases approximately three times as much as for radial polarization, with the axis of the laser rod as a reference. In other words, the index of refraction increases towards the periphery of the rod by a representative amount $z$ for radial polarization, whereas for tangential polarization, the index of refraction increases by a representative amount $3z$.

FIG. 5 also depicts variation 116 of the wave front due to temperature. Since temperature is greatest at the laser rod periphery due to the proximity of the flash tube, it is assumed that the higher index of refraction will be at the axis of the rod, since heat has a lessening effect on the index of refraction by dispersing the molecules of the medium more as a temperature is increased. This statement is made with the understanding that index of refraction can also increase with temperature, depending on the composition of the glass, but the subsequent analysis and choice of glass composition is made so that index of refraction varies inversely with temperature in the manner assumed. The curvature of the wave front resulting from the variation of index of refraction 116 due to temperature will, therefore, be in the opposite direction from its variations 108 and 114 caused by stresses, if the direction of propagation is assumed to be that shown by arrow 110.

With the stress distributions and variations in index of refraction as shown by FIG. 4 and as thus described, the apparatus according to the present invention is designed to provide a plane polarized output of the laser rod with a uniform intensity at the output aperture. Means are provided whereby, if light propagates through a medium having a variation in the index of refraction such as to give the wave fronts represented by the curves 108, 114 and 116, is reflected by mirror 118, it is returned to the laser rod in a direction of propagation 112 with polarization in the radial direction if the polarization in direction 110 was tangential, and with tangential polarization if the polarization in the direction 110 was radial; the variation 120 in index of refraction will result, since at any given point such as 122 the same light wave will encounter an average of the variation in index of refraction for tangentially and radially polarized light. It does not matter that the radially polarized light is propagating in one direction and the tangentially polarized light is propagating in the other direction, since it is important only to have a plane wave front in a plane through a particular point on the laser axis. Average wave front 120 then counterbalances wave front 116 and the result is a plane wave 121 with a wave front in a plane perpendicular to the axis.

Figure 6:
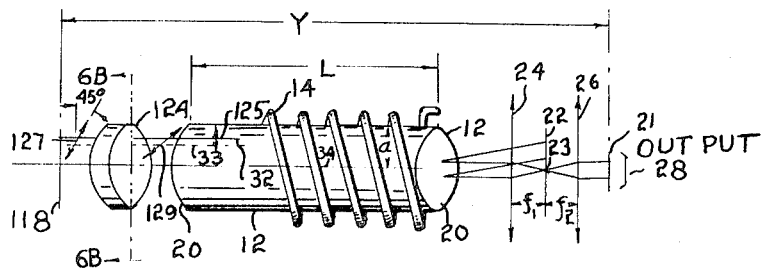
FIG. 6 is a schematic representation, partially in isometric, of a laser apparatus constructed according to the principles of the present invention, with FIG. 6A being an enlarged view of a portion thereof.
Figure 6A:
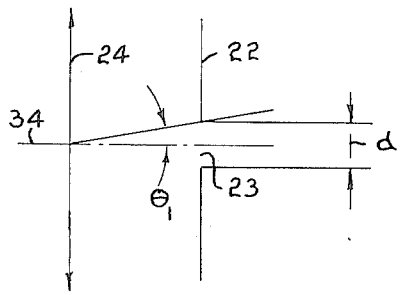
FIG. 6B is a representation of the $HE_{11}$ mode of propagation with electric vector directions shown before being rotated and after two one-eighth wave rotators.

FIGS. 6 and 6A show the apparatus according to the present invention, wherein a laser rod 12 is concentrically surrounded by a spatially related helical flash tube 14, the coils of which are sufficiently proximate to assure uniformity of illumination along the length of the core 12 and to prevent a significant temperature gradient along the length of the core. (The energizing circuits are not shown since they are conventional). An efficient reflector 118 is adjacent one end of the laser rod 12 and both ends of the rod are provided with nonreflective surfaces 20, with mirror 21 forming the other end of the resonant cavity. As is understood, mirror 21 is partially transmissive so that the laser output may escape from the cavity. Pin hole deflector 22 is located near the output side of the laser rod between two lenses 24 and 26, and at the back side of line 24, at a distance equal to the focal lens $f_1$ of that lens. Lens 26 is located on the opposite side of the pin hole deflector and at a distance from lens 24 equal to the total of the focal lengths $f_1$ and $f_2$ of the two lenses. A Faraday rotator or eighth-wave plate 124 is placed at the end of the laser rod nearest to the total reflector 118.

It should be understood that the description of a helical flash tube surrounding the laser rod is illustrative only and it is possible to have a flash tube that is similar in shape to the laser rod and disposed parallel with it to similarly provide uniform heating along the length of the rod but uneven heating radially throughout the rod.

The enlarged view, FIG. 6A, is of a portion of the apparatus of FIG. 6, which comprises lens 24 and pinhole absorber 22. Rays propagated along the axis 34 from the laser rod are bent on angle $\theta_1$ with the horizontal and this is the limiting angle along which a ray of laser output light can be emitted through the pinhole 23. The actual diameter $d$ of the pinhole 23 is computed by use of the following relationships after $u$, a parameter related primarily to angle has been chosen, to discriminate against certain of the modes of FIG. 1:

$$\sin \theta_1 = \lambda u / 2\pi a,$$

where $\lambda$ is the wavelength of the laser output and $a$ is the radius of the laser rod 12

$$d/2 = f_1 \tan \theta_1.$$

Figure 6B:
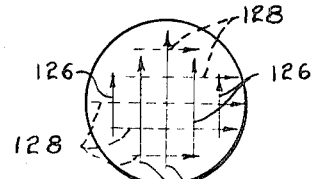

Therefore, by the proper choice of $u$, and the resulting diameter of the pinhole 23, mode $HE_{11}$ is chosen and will be the only mode propagated within the resonant cavity. That mode contains, as shown in FIG. 6B by the solid arrows, electric vectors 126 in a vertical direction only, with the designation HE representing the hybrid electric modes of propagation and the first subscript representing the number of full period variations of the radial component of field along angular coordinates, and the second subscript defining the number of half period variations of the angular component of field along radial coordinates. The center arrow is an electric vector that is equivalent to radial polarization, whereas the outermost arrows 126 represent electric vectors that are equivalent to tangential polarization. In this way, the propagation of the $HE_{11}$ mode produces varying wave front shapes, according to their position in FIG. 6B, as was shown by variations 108 and 114 in FIG. 5.

As was previously described, the varying wave front configurations, including that caused by the temperature only and those caused by stress, can be compensated by rotating the electric vectors of FIG. 6B by 90° so that at a particular point between the laser rod 12 and the reflecting surface 118, the polarization of light will be equally radial and tangential, thereby producing an average effect of the two planes of polarization. In order to accomplish this, a Faraday rotator 124, which is a one-eighth wave rotator, is provided to thereby produce a 45° rotation in the light for each of its passages through the rotator.

A Faraday rotator is operated by a magnetic field (not shown) with lines of force parallel to the axis that breaks incident light into two counterrotating circularly polarized components which then propagate through the rotator with different indices of refraction. Thus, the components do not retain a fixed phase relation between themselves as they pass through the rotator, and upon emerging from the exit end will recombine to form polarized light of the same character as that which initially entered, but the polarization of this light will be rotated by an angular amount which depends upon the Verdet constant of the rotator material, the applied magnetic field, and the axial length of the rotator element. By properly choosing a Faraday rotator system according to the above, the rotation of 45° of the light in each direction of its passage can be attained.

By way of example, if light ray 32 comes out of the laser rod and into the Faraday rotator 124 with polarization in a direction represented by electric vector 125, that vector will be rotated 45° to a position shown by vector 127 after it emerges from the rotator. The ray will be reflected from element 118 and be directed back towards the laser rod (this reflected light path is depicted by dotted line 33), and upon passing through the rotator 124 a second time will be rotated another 45° and emerge with a direction of polarization represented by vector 129, which is a total of 90° different than the position of entering vector 125. The variation in the wave front for the average of the tangentially polarized (129) and radially polarized (125) light ray is then as shown by dotted representation 120 of FIG. 5. This variation of wave front is equal and opposite to the variation 116 caused by temperature only, and the result 121 is therefore a plane wave front with no variation from axis to periphery of the laser rod, thereby solving the stress birefringence problem alluded to previously. As this point, it is only necessary to compute the value of thermal coefficient $\gamma$ in order to choose the proper composition of the laser material to satisfactorily reduce the path difference from axis to periphery to zero. Furthermore, pinhole 23 has eliminated the nonaxial modes and the laser output intensity is thereby enhanced as described in the introduction.

To compute the range of values required for the thermal coefficient of the index of refraction $\alpha_n$ and the thermal coefficient of linear expansion $\alpha_L$ in order to minimize the thermal changes in the cavity, calculations will be made for the extreme cases of the rod being very long, in which case the end effects are small the circumstance reasonable approximates that of plane stress; and the length being much shorter than the diameter, in which case the end effects predominate and the constraints correspond closely to plane stress.

Given a laser of length $L$ and index of refraction $n$ which consists of a large number of thin concentric cylinders, a temperature gradient is assumed to exist between the center cylinder and the outermost cylinder; however, each cylinder is at a uniform temperature. Remote end reflectors are used which are rigidly mounted and spaced apart by distance $Y$. The total path length $P$ in the cavity for a typical ray is given by $$P = nL + Y - L(n-1)L + Y. \quad (1)$$

With a difference in temperature between the center and edge of the laser of $\Delta T$, the difference in optical path length for rays which go through the center versus those passing near the edge is given by the following equation:

$$\Delta P = dP/dT \, \Delta T = dn/dT \, L + (n-1) \, dL/dT \, \Delta T. \quad (2)$$

The condition that $\Delta P$ be equal to 0 is then $$n(\alpha_n + \alpha_L)/\alpha = 1 \quad (3)$$

Where, $$\alpha_L = (1/n)(dL/dT), \quad (4)$$

and $$\alpha_n = (1/n)(dn/dT). \quad (5)$$

For convenience in later use the parameter $n(\alpha_n + \alpha_L)/\alpha_L$ is defined at $\gamma$.

Thermoelastic properties of solid cylinders of radius $a$ and length $L$ are in general complicated problems. Some simplification is introduced by assuming symmetrical heating, so that the temperature $T$ is a function only of the radius.

The stress and strain distributions are easily managed for the limiting cases of $L$ much smaller than $a$ or $L$ much larger than $a$. The former case is than of the plane stress, the latter corresponds to plane strain.

Because of the symmetrical heating of the right circular cylinder all the shear components of stress and strain can be dropped. With a cylindrical coordinate system $r$, $\theta$, and $z$, the strain components $\epsilon$ are related to the stress components $\sigma$ by $$\epsilon_{rr} = \frac{1}{E}[\sigma_{rr} - \nu(\sigma_{\theta\theta} + \sigma_{zz})] + \alpha_L T \quad (6)$$

$$\epsilon_{\theta\theta} = \frac{1}{E}[\sigma_{\theta\theta} - \nu(\sigma_{rr} + \sigma_{zz})] + \alpha_L T \quad (7)$$

$$\epsilon_{zz} = \frac{1}{E}[\sigma_{zz} - \nu(\sigma_{rr} + \sigma_{\theta\theta})] + \alpha_L T \quad (8)$$

where $T$ is the temperature at the position $r$ from the center of the rod, $\alpha_L$ is the thermal coefficient of linear expansion, $E$ is Young's modulus, and $\nu$ is Poisson's ratio.

In the case of a disc where $L$ is much smaller than $a$ the problem becomes that of plane stress. The stress components in terms of the temperature distribution in the rod become $$\sigma_{rr} = \alpha_L E \left[\frac{1}{a^2}\int_0^a Tr dr - \frac{1}{r^2}\int_0^r Tr dr\right] \quad (9)$$

$$\sigma_{\theta\theta} = \alpha_L E \left[\frac{1}{a^2}\int_0^a Tr dr + \frac{1}{r^2}\int_0^r Tr dr - T\right] \quad (10)$$

$$\sigma_{zz} = 0. \quad (11)$$

If the rod length $L$ is much larger than the radius $a$ it is not unreasonable to neglect end effects and consider only a typical section well removed from the end of the rod. This becomes a case of plane strain, and in such a case two situations must be distinguished: if the ends of the rod remain fixed, so that the total length does not change, this corresponds to the condition $$\epsilon_{zz} = 0. \quad (12)$$

however, if the ends are free of traction so that they can move in response to the heating the condition which applies is $$\sigma_{zz} = \sigma_{rr} + \sigma_{\theta\theta}. \quad (13)$$

The case of interest in a long laser rod is the latter. For it, the stresses are given by $$\sigma_{rr} = \frac{\alpha_L E}{1-\nu}\left(\frac{1}{a^2}\int_0^a Tr dr - \frac{1}{r^2}\int_0^r Tr dr\right) \quad (14)$$

$$\sigma_{\theta\theta} = \frac{\alpha_L E}{1-\nu}\left(\frac{1}{a^2}\int_0^a Tr dr + \frac{1}{r^2}\int_0^r Tr dr - T\right) \quad (15)$$

$$\sigma_{zz} = \frac{\alpha_L E}{1-\nu}\left(\frac{2}{a^2}\int_0^a Tr dr - T\right) \quad (16)$$

The relative importance of end effects depends on the length to diameter ratio of the rod. If the rod is very long the end effects are small and the problem reasonably approximates that of plane strain. On the other hand, if the length is much shorter than the diameter the end effects predominate and the constraints correspond fairly closely to plane stress. If the length and diameter are comparable, an intermediate situation between plane stress and plane strain applies. To show the range of values required for $\alpha_n$ and $\nu$ in order to minimize the thermal changes in the cavity, calculations will be made for these two extreme cases.

The long rod is a commonly used geometry. The case of a large number of discs stacked together would follow plane stress in its thermoelastic behavior.

Let the laser be in the form of a long cylinder of radius $a$ and length $L$ with rigidly fixed, removed end mirrors spaced apart a distance $D$. The two cases of a solid laser rod or one consisting of many discs will be treated separately. For the solid rod the total optical path length $P_{rr}(r)$ for a typical ray parallel to the axis and displaced a distance $r$ from the center and with its plane of polarization in the radial direction is given by $$P_{rr}(r) = nL\{1 + [\alpha_n T - \{P(\epsilon_{zz} + \epsilon_{\theta\theta}) + Q\epsilon_{rr}\}]\} + D - L \quad (17)$$

where $T$ is the difference in temperature between the center and a point at a distance $r$ from the center. The quantities $P$ and $Q$ are the stress-optic coefficients which relate the change in index of refraction due to the strains in the directions perpendicular and parallel, respectively to the plane of polarization of the light. Similarly, for the solid rod the total optical path length $P_{\theta\theta}(r)$ for a typical ray parallel to the axis and displaced a distance $r$ from the center and with its plane of polarization in the tangential direction is given by $$P_{\theta\theta}(r) = nL\{1 + [\alpha_n T - \{P(\epsilon_{zz} + \epsilon_{rr}) + Q\epsilon_{\theta\theta}\}]\} + D - L \quad (18)$$

The strains $\epsilon_{zz}$, $\epsilon_{rr}$, and $\epsilon_{\theta\theta}$ in eqs. (17) and (18) are given in terms of the stresses $\sigma_{zz}$, $\sigma_{rr}$, and $\sigma_{\theta\theta}$ by eqs. (6), (7) and (8) but with the thermal terms $\alpha T$ dropped from these equations. The stresses are then related to the temperature distribution by eqs. (14), (15), and (16).

The corresponding expressions for the total optical paths for the stacked discs laser configuration are $$P'_{rr}(r) = nL\left\{1 + \left[\alpha_n T + \frac{n-1}{n}\alpha T - \{P(\epsilon_{zz} + \epsilon_{\theta\theta}) + Q\epsilon_{rr}\}\right]\right\} + D - L \quad (19)$$

$$P'_{\theta\theta}(r) = nL\left\{1 + \left[\alpha_n T + \frac{n-1}{n}\alpha T - \{P(\epsilon_{zz}+\epsilon_{rr})+Q\epsilon_{\theta\theta}\}\right]\right\} + D - L \quad (20)$$

The primes on $P'_{rr}(r)$ and $P'_{\theta\theta}(r)$ serve to distinguish the stacked discs case from that of the solid cylindrical rod. The strains $\epsilon_{zz}$, $\epsilon_{rr}$, and $\epsilon_{\theta\theta}$ in eqs. (19) and (20) are given in terms of the stresses $\sigma_{zz}$, $\sigma_{rr}$ and $\sigma_{\theta\theta}$ by eqs. (6), (7) and (8) but with the thermal terms $\alpha T$ dropped from these equations. The stresses are then related to the temperature distribution by eqs. (9), (10) and (11).

Before proceeding to calculate the optical path lengths for the various cases, a word first on the birefringence produced by the radial and tangential stresses. Since stress in the radial direction, $\sigma_{rr}$, differs from stress in the tangential direction, $\sigma_{\theta\theta}$, except at the center of the rod a plane wave of arbitrary polarization will of necessity be distorted on passing through the laser. It is possible to choose the expansion coefficient and the thermal coefficient of index in such a way as to make the path for a ray through the center of the rod be equal to the path length of a ray through the edge of the rod with polarization tangential and radial, but in general not for both. If the ray through the center has an optical path equal to that of an edge ray which is tangentially and radially polarized, one can excite a single lowest order $HE_{11q}$ mode.

Carrying out the indicated substitutions the differences in optical path lengths, $\Delta P_{rr}(r)$, $\Delta p_{\theta\theta}(r)$, $\Delta P'_{rr}(r)$, and $\Delta P'_{\theta\theta}(r)$, for rays at the center and at the distance $r$ from the center for the four cases considered above become $$\Delta P_{rr}(r) = nL\left\{T\alpha_n - \frac{\alpha}{1-\nu}[R(1+\nu)(P-Q)+T(-2(1-\nu)P+2\nu Q)]\right\} \quad (21)$$

$$\Delta P_{\theta\theta}(r) = nL\left\{T\alpha_n - \frac{\alpha}{1-\nu}[-R(1+\nu)(P-Q)+T(-(1-3\nu)P-(1-\nu)Q)]\right\} \quad (22)$$

$$\Delta P'_{rr}(r) = nL\left\{T\left(\alpha_n + \frac{n-1}{n}\alpha\right) - \alpha[R(1+\nu)(P-Q)+T(-(1-\nu)P+\nu Q)]\right\} \quad (23)$$

$$\Delta P'_{\theta\theta}(r) = nL\left\{T\left(\alpha_n + \frac{n-1}{n}\alpha\right) - \alpha[-R(1+\nu)(P-Q)+T(2\nu P - Q)]\right\} \quad (24)$$

where the quantity $R$ has been defined by $$R = \frac{1}{r^2}\int_0^r Tr\,dr \quad (25)$$

If the optical path length through the center is made equal to the average path length for radial and tangential components of polarization the pertinent quantities are $$\frac{\Delta P_{rr}(r)+\Delta P_{\theta\theta}(r)}{2} = nLT\left\{\alpha_n - \frac{\alpha}{1-\nu}\left[P\left(\frac{-3+5\nu}{2}\right)+Q\left(\frac{-1+3\nu}{2}\right)\right]\right\} \quad (26)$$

$$\frac{\Delta P'_{rr}(r)+\Delta P_{\theta\theta}(r)}{2} = nLT\left\{\alpha_n + \frac{n-1}{n}\alpha - \alpha\left[P\left(\frac{-1+3\nu}{2}\right)+Q\left(\frac{-1+\nu}{2}\right)\right]\right\} \quad (27)$$

For the optical path lengths to be equal for rays through the center and at the radius $r$ for the various cases considered above the quantities in the curly brackets above must be equal to zero. This leads to the various following conditions on the parameters describing the properties of the glass such as $\alpha_n$, $\alpha$, etc.

Long Rod $$\Delta P_{rr} = 0: \alpha_n = \frac{\alpha}{1-\nu}\left[\frac{R}{T}(1+\nu)(P-Q)-2(1-\nu)P+2\nu Q\right] \quad (28)$$

$$\Delta P_{\theta\theta} = 0: \alpha_n \frac{\alpha}{1-\nu}\left[-\frac{R}{T}(1+\nu)(P-Q)-(1-3\nu)P-(1-\nu)Q\right] \quad (29)$$

$$\frac{\Delta P_{rr}+\Delta P_{\theta\theta}}{2} = 0: \alpha_n = \frac{\alpha}{1-\nu}\left[P\left(\frac{-3+5\nu}{2}\right)+Q\left(\frac{-1+3\nu}{2}\right)\right] \quad (30)$$

Stacked Discs $$\Delta P'_{rr} = 0: \alpha_n = -\frac{n-1}{n}\alpha + \alpha\left[\frac{R}{T}(1+\nu)(P-Q)-(1-\nu)P+\nu Q\right] \quad (31)$$

$$\Delta P'_{\theta\theta} = 0: \alpha_n = -\frac{n-1}{n}\alpha + \alpha\left[-\frac{R}{T}(1+\nu)(P-Q)+2\nu P - Q\right] \quad (32)$$

$$\frac{\Delta P'_{rr}+\Delta P'_{\theta\theta}}{2} = 0: \alpha_n = -\frac{n-1}{n}\alpha + \alpha\left[P\left(\frac{-1+3\nu}{2}\right)+Q\left(\frac{-1+\nu}{2}\right)\right] \quad (33)$$

To obtain a rough indication of the values that are typical for glasses let $\alpha = 10^{-5}/°C$, $P=0.3$, $Q=0.21$, $\nu=0.25$, $n=1.5$ and $R/T = 0.25\alpha_n$, values become Long Rod $$P_{rr} = 0: \alpha_n = -42 \times 10^{-7}/°C. \quad (34)$$
$$\Delta P_{\theta\theta} = 0: \alpha_n = -34 \times 10^{-7}/°C. \quad (35)$$
$$\frac{\Delta P_{rr}+\Delta P_{\theta\theta}}{2} = 0: \alpha_n = -38 \times 10^{-7} \quad (36)$$

Stacked Discs $$\Delta P'_{rr} = 0: \alpha_n = -48 \times 10^{-7} \quad (37)$$
$$\Delta P'_{\theta\theta} = 0: \alpha_n = -42\ 10^{-7} \quad (38)$$
$$\frac{\Delta P'_{rr}+\Delta P'_{\theta\theta}}{2} = 0: \alpha_n = -45 \times 10^{-7} \quad (39)$$

The $r$ values for two case are given below $$\frac{\Delta P_{rr}+\Delta P_{\theta\theta}}{2} = 0: \nu = n\frac{\alpha n + \alpha}{\alpha} \quad (40)$$

$$\nu = n\left\{1+\frac{1}{1+\nu}\left[P\left(\frac{-3+5\nu}{2}\right)+Q\left(\frac{-1+3\nu}{2}\right)\right]\right\}$$
$$\text{or} = 0.93. \quad (41)$$

Stacked Discs $$\frac{\Delta P'_{rr}+\Delta P'_{\theta\theta}}{2} = 0: \nu = l + n\left[P\left(\frac{-1+3\nu}{2}\right)+Q\left(\frac{-1+\nu}{2}\right)\right]$$
$$\nu = 0.83. \quad (42)$$

Figure 7:
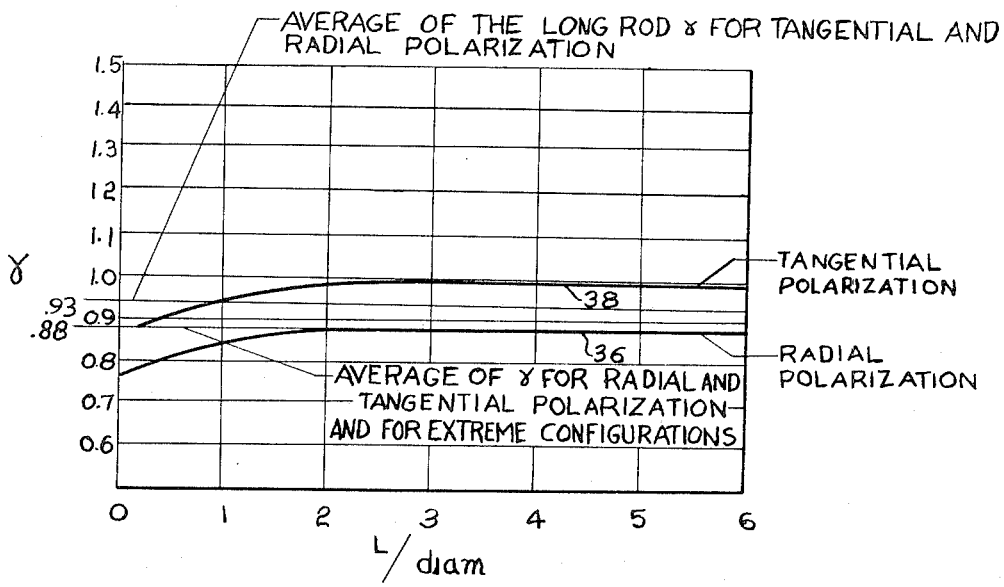
FIG. 7 is a plot of the thermal coefficient $\gamma$ versus L/diam. configuration constants useful in choosing a host composition desirable for laser operation according to the invention.

The conditions imposed on $\alpha_n$ and $\gamma$ are summarized in FIG. 8 for the three cases considered of the thin concentric cylinders, the long rod, and the stacked discs, and the results appear in the plot of FIG. 7.

A number of laser glasses and commercially available glass compositions have been measured for $\alpha_n$ and $\gamma$. The values of $\alpha_n$ were found to vary from $-37\times10^{-7}$ up to $45\times10^{-7}$ at room temperature. The room temperature values for $\gamma$ were from 0.85 to 1.96, and at liquid nitrogen the low value was down to 0.26.

In an actual laser, by choosing the lengths of the rod properly and with careful attention given to means for avoiding the complications involved in stress induced birefringence, the values required for $\alpha_n$ and $\gamma$ are intermediate the extremes indicated in FIG. 8. The measured values straddle the values shown in FIG. 8; hence it is possible to design thermally stable laser cavities by the choice of a particular mode, having both radial and tangential components, and accordingly choosing $\gamma$ and then L/diam. values from FIG. 7. If the $HE_{11}$ mode is isolated by the apparatus of FIGS. 6 and 6A, values of 0.88 for $\gamma$ and approximately 1.10 for the length to diameter ratio satisfy the requirement of compensating for the thermal distribution problem described. However, these values are for illustrative purposes only. It is sometimes desirable to choose the thermal coefficient $\gamma$ anywhere intermediate the extremes shown on the plot of FIG. 7, according to the available laser material. In this way, it is also possible to design the composition of laser material according to the length-to-diameter ratio desired which is usually the greatest L/diam. ratio possible within the extremes shown. For instance, a $\gamma$ of approximately 0.93 could be selected. Also, by not choosing the exact average of radial and tangential polarization, the thermal gradient effects are nevertheless substantially eliminated, although the stress birefringence problem is not as satisfactorily solved.

In any embodiment of the invention, it is necessary that the glass base have an $\alpha_n$ which is negative in order that algebraic cancellation of the other positive effects of thermal gradients is possible. In the present invention, the laser device has a mode limiting means which limits the mode being propagated to only the $HE_{11}$ mode. Since the $HE_{11}$ mode has both radially polarized vectors and tangentially polarized vectors, a polarization rotator is included so that alternate passes of light are successively radially and tangentially polarized to provide an optical path length equal to the average of the radial and tangential polarized path length. The composition of the material through which the laser light is propagated is chosen so that the coefficient of linear expansion, the temperature coefficient of the index of refraction, Poisson's ratio, and the stress-optical effect equalized the optical path length for a ray through the center of the body with the average value of the optical path length for radially and tangentially polarized light at the edge of the laser body. With other variables remaining constant, any glass with a negative $\alpha_n$ will be more thermally stable than the glass with a positive $\alpha_n$ for the average value of the optical path length for radially and tangentially polarized light. However, any glass that has a negative coefficient of the index of refraction of $\alpha_n$ can be optimized by well-known recognized method of computer regression analysis. Thus, a computer can be programmed so that the constituents in the glass that tend to make $\alpha_n$ negative are revealed, along with those constituents that tend to make the linear expansion coefficient, Poisson's ratio and the stress-optical coefficient positive. In short, the invention resides in the laser device with a mode limitor for mode limiting those modes which have both radially and tangentially polarized vectors and to propagate these modes in a glass host with an $\alpha_n$ sufficiently negative to algebraically cancel the other positive factors effected by thermal gradients. The device also contains a rotator for rotating alternate passes of light 90° so that those vectors which were radially polarized in one pass become tangentially polarized in a subsequent pass. Thus, providing an optical path length equal to the average value for radial and tangential polarization.

The following glass compositions have been found to have a coefficient of linear expansion, a temperature coefficient of the index of refraction, Poisson ratio, and a stress-optical effect such that the difference between the optical path length for a ray at the center of the body and the average value of the optical path length for radially and tangentially polarized light passing along the body near the periphery thereof is essentially zero when a temperature gradient is present within the body from the center to the periphery:

| Material | Example 1 in wt. % | Example 2 in wt. % | Example 3 in wt. % |
|---|---|---|---|
| $LiO_2$ | 41.6 | 40.0 | 42.0 |
| $Na_2O$ | 14.4 | 7.0 | — |
| $K_2O$ | — | — | 23.1 |
| $BaO$ | 26.7 | 20.0 | 18.8 |
| $ZnO$ | — | — | 4.0 |
| $Al_2O_3$ | — | — | 2.5 |
| $Nb_2O_3$ | 15.4 | — | — |
| $TiO_2$ | — | — | 5.9 |
| $Sb_2O_3$ | 0.9 | — | 2.7 |
| $La_2O_3$ | — | 22.0 | — |
| $Nd_2O_3$ | 1.0 | 1.0 | 1.0 |

It is also possible to select a thermally stable glass base for ions other than $Nd_2O_3$. For a consideration of just the glass base for other $Nd_2O_3$ concentrations or other active ions all components in the above examples can be multiplied by fact of 1.01 thus giving a base for the glass without an active ion. This can be considered as the glass into which other ions can be doped in small amounts without effecting the thermal properties of the glass. The above examples represent a preferred embodiment. Other ranges are possible and are contemplated as part of the invention.

While a particular embodiment and analysis useful for the general problem have been discussed, other embodiments and configurations are contemplated. The invention is not to be limited by such discussions but is to be accorded the full scope of the following claims.

I claim:

1. A laser apparatus including a laser body in an optically regenerative cavity having an optical axis within said cavity and containing a mode-limiting means including an aperture along said axis for discriminating against all but the $HE_{11}$ mode, and a polarization rotator along said axis is provided for rotating the polarization of the output 90° whereby alternate passes of light in paths along the length of said axis are successively radially and tangentially polarized to provide an optical path length equal to the average of the radial and tangential polarized light path lengths, the composition of the material of said body being so chosen that the coefficient of linear expansion, the temperature coefficient of the index of linear expansion, the temperature coefficient of the index of refraction, Poisson's ratio, and the stress-optical effect essentially render zero, the difference between the optical path length for a ray through the center of the body and the average value of the optical path length for radially and tangentially polarized light passing along said body near the periphery thereof when a temperature gradient is present within the body from its center to its periphery.

2. The apparatus according to claim 1 wherein the polarization rotator is a one-eighth wave Faraday rotator.

3. The apparatus according to claim 2 wherein the mode limiting means also includes two parallel lenses arranged adjacent to one end of the laser body, the lenses being spaced from each other a distance equal to the sum of their focal length and disposed coaxially within the laser body and the mode-selecting aperture being provided in a diaphragm arranged parallel to and between the lenses at the common focal point.

4. The apparatus according to claim 3 wherein said aperture is placed between a totally reflecting mirror and a partially reflecting mirror disposed respectively one at each end of said laser body to provide said optical regenerative cavity.

5. A laser device including a body of solid laser material in an optically regenerative cavity having an optical axis within said cavity, the composition of the material of said body being so chosen that the coefficient of linear expansion, the temperature coefficient of the index of refraction, Poisson's ratio and the stress-optical effect essentially render zero, the difference between the optical path lengths for a ray through the center of the body and the average optical path length for radial and tangential polarized light passing along said body near the periphery thereof when a temperature gradient is present within the body from its center to its periphery, said body having the shape of a right, circular, cylindrical rod with end faces and a cylindrical surface;

a mode-limiting means including an aperture along said axis for discriminating against all but the $HE_{11}$ mode;

a pair of parallel lenses disposed near one end of said body in planes perpendicular to the axis of said body, said lenses being separated by the sum of their focal lengths and being coaxial within said body;

said aperture being defined by an opening in a light opaque plate, said plate being disposed parallel to and between said lenses and at the back focal point of the lens nearest said body, said plate having a pinhole at its center forming said aperture, said pinhole having a diameter $d$ bearing the following relationship to the focal length $F_1$ of the nearest lens $d/2 = f_1 \tan \theta_1$ and $\theta = u\lambda/2\pi a$ for small angles, where $\lambda$ is the wavelength of the laser output, $a$ is the radius of said laser body, $u$ is a parameter related primarily to angle and is chosen to eliminate all but the $HE_{11}$ mode of propagation of said laser output, which mode has both radial and tangential electric vectors and whose intensity and phase are constituted such as to give approximately a uniform plane polarized distribution across the aperture of the rod and which is the lowest order hybrid mode; and a magneto-optic rotator disposed adjacent the other end of said laser body for averaging the radial and tangential vectors of said mode.

6. The apparatus according to claim 5 wherein substantially totally reflecting mirror is disposed in a plane perpendicular to said body axis, coaxial with said body, adjacent said magneto-optic rotator and further from said body than said rotator for receiving rays from said rotator and retransmitting the rays to said rotator, with the retransmitted rays being rotated by said rotator one-eighth wave from their direction before passing through said rotator; and a partial reflecting mirror is coaxial with said body adjacent the other end of said body from said rotator and further away from said body than said lenses, said partially reflecting mirror defining with said totally reflecting mirror a laser resonant cavity.

7. The laser apparatus according to claim 6 wherein said body is formed of glass, said glass consisting essentially of the following approximate composition in weight percent:

| | |
|---|---|
| $LiO_2$ | 41.6 |
| $Na_2O$ | 14.4 |
| $BaO$ | 26.7 |
| $Nb_2O_3$ | 15.4 |
| $Sb_2O_3$ | 0.9 |
| $Nd_2O_3$ | 1.0 |

8. The laser apparatus according to claim 6 wherein said body is formed of glass, said glass consisting essentially of the following approximate composition in weight percent:

| | |
|---|---|
| $LiO_2$ | 40.0 |
| $Na_2O$ | 7.0 |
| $BaO$ | 20.0 |
| $La_2O_3$ | 22.0 |
| $Nd_2O_3$ | 1.0 |

9. The laser apparatus according to claim 6 wherein said body is formed of glass, said glass consisting essentially of the following approximate composition in weight percent:

| | |
|---|---|
| $LiO_2$ | 42.0 |
| $K_2O$ | 23.1 |
| $BaO$ | 18.8 |
| $ZnO$ | 4.0 |
| $Al_2O_3$ | 2.5 |
| $Nb_2O_3$ | 5.9 |
| $Sb_2O_3$ | 2.7 |
| $Nd_2O_3$ | 1.0 |

* * * * *